United States Patent
Ahn et al.

(10) Patent No.: US 6,876,355 B1
(45) Date of Patent: Apr. 5, 2005

(54) TOUCH SCREEN STRUCTURE TO PREVENT IMAGE DISTORTION

(75) Inventors: Young Soo Ahn, Anyang-shi (KR); Yun Cheol Jeong, Seoul (KR); Young Jin Oh, Kyunggi-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/572,498

(22) Filed: May 18, 2000

(51) Int. Cl.[7] .................................................. G09G 3/36
(52) U.S. Cl. .......................................... 345/173; 345/87
(58) Field of Search ................................. 345/173, 174, 345/176, 182, 87, 88; 349/155, 156, 157, 174, 139, 162; 178/18.03, 18.05, 18.09, 18.06

(56) References Cited

U.S. PATENT DOCUMENTS

| | | | | |
|---|---|---|---|---|
| 5,852,487 A | * | 12/1998 | Fujimori et al. | ............ 349/162 |
| 6,057,903 A | * | 5/2000 | Colgan et al. | ............... 349/139 |
| 6,208,402 B1 | * | 3/2001 | Tajima | ........................ 349/156 |

FOREIGN PATENT DOCUMENTS

JP          A60182414          9/1985

\* cited by examiner

*Primary Examiner*—Chanh Nguyen
(74) *Attorney, Agent, or Firm*—Birch, Stewart, Kolasch & Birch, LLP

(57) ABSTRACT

A touch panel-mounted liquid crystal panel minimizes picture distortion upon driving of the touch panel. In the liquid crystal panel, a lower glass substrate has switching devices provided in the vicinity of intersections between data lines and gate lines. An upper glass substrate has a black matrix joined to it. Patterned clusters of spacers are positioned at an area corresponding to the black matrix in such a manner to enlarge its contact area with the upper glass substrate, thereby keeping a uniform distance between the upper and lower glass substrates. The enlarged contact area allows the patterned clusters of spacers to sufficiently absorb a pressure load of a finger or a stylus pen. Accordingly, uniform distance between the upper and lower glass substrates is maintained even upon driving the touch panel. As a result, light deterioration and local image distortion is prevented or minimized.

16 Claims, 13 Drawing Sheets

TOUCH SCREEN STRUCTURE TO PREVENT IMAGE DISTORTION

BACKGROUND OF THE INVENTION

1. Field of the Invention

This invention relates to a liquid crystal display panel, and more particularly to structures within a liquid crystal display panel with a touch panel to minimize light deterioration and image distortion.

2. Description of the Related Art

A conventional liquid crystal display panel controls a light transmissivity of liquid crystal cells to display a picture. Liquid crystal cells are formed between two glass substrates. Each liquid crystal cell responds to a video signal, i.e. a pixel signal, to control the transmitted light quantity.

Such a liquid crystal display panel maybe mounted with a touch panel to be used as an input device. A user touches the touch panel through a stylus or a finger to input instructions or information. The touch panel generates a voltage or current signal corresponding to a position where the touch panel is touched.

The touch panel can be either a capacitive or a resistive type. FIG. 1 shows a liquid crystal display panel 10 mounted with a capacitive touch panel 12 and FIG. 2 shows the same liquid crystal display panel 10 mounted with a resistive touch panel 16.

Referring to FIG. 1, the liquid crystal display panel 10 includes upper and lower polarizing sheets 14A and 14B. Upper and lower glass substrates 20B and 20A are positioned below and above the upper and lower polarizing sheets 14A and 14B, respectively. Gate lines 23, insulating film 24, pixel electrodes 25A, and a first orientation film 26A are sequentially provided above the lower glass substrate 20A. Below the upper glass substrate 20B, a black matrix 27, color filter 28, a common electrode 25B, and a second orientation film 26B are sequentially provided.

Finally, ball spacers 22 and a liquid crystal material 21 are disposed between the first and second orientation films 26A and 26B. The purpose of the ball spacers 22 is to keep the distance between the upper and lower glass substrates 20B and 20A as uniform as possible. This in turn keeps the thickness of the liquid crystal material 21 uniform as well.

Also referring to FIG. 1, the capacitive touch panel 12 includes a glass sheet 30, an electrode layer 31, and an insulating layer 32 sequentially disposed above the upper polarizing sheet 14A. The electrode layer 31 serves as a dielectric layer, and the insulating layer 32 prevents an electrical short from occurring when the touch panel 12 is pressurized by an input device such as a stylus or a finger (not shown).

When the touch panel 12 is pressurized, a capacitance value is changed at the pressurized point. The electrode layer 31 detects the capacitance value and generates either a current or a voltage signal corresponding to the capacitance value.

Referring to FIG. 2, the liquid crystal display panel 10 is the same as the display panel described in FIG. 1. Thus, detailed description of the display panel 10 is omitted. The touch panel 16 of FIG. 2 is resistive. The resistive touch panel 16 includes a glass sheet 33, first and second electrode layers 36A and 38B above the glass sheet 33, touch panel spacers 35 disposed in between the first and second electrode layers 36A and 36B, and an insulating sheet 34 above the second electrode layer 36B.

When the touch panel 16 is pressurized, a short is created between the first and second electrode layers 36A and 36B at the pressurized point, which generates differing current or voltage corresponding to the pressurized point.

As mentioned above, ball spacers 22 are used to maintain a uniform distance between the upper and lower glass substrates 20B and 20A in the liquid crystal display panel 10 of FIGS. 1 and 2. However, the display image becomes distorted at the points where the touch panel 12 or 16 is pressurized, for example by a stylus or a finger.

More specifically, when the stylus is used on the touch panel 12 or 16, the upper glass substrate 20B is also pushed corresponding to the position of the stylus on the touch panel. Then the distance between the upper and lower glass substrates 20B and 20A is locally narrowed, and thus the electric field intensity applied to the liquid crystal material 21 is locally changed as well. This changes the amount of light transmitted around the pressurized area.

Another contributing factor to the distortion is that the pressure created by the stylus or the finger cannot sufficiently be absorbed due to the ball spacers 22 making point contacts with the upper and lower glass substrates 20B and 20A.

Further, the amount of distortion varies depending on the position of the pressurized point. This is because ball spacers 22 are not uniformly distributed. As shown in FIG. 3, the density of ball spacers 22 are not uniformly among the different pixel electrodes 25A on the lower glass substrate 20A. As a result, amounts of light deterioration and image distortion are different according to the position of the pressurized point.

To prevent image distortion as described above, it has been suggested to densely spread the ball spacers 22. However, distortion still occurs even if the balls spacers are more densely packed. For example, FIGS. 4A and 4B show a display panel where the ball spacer density is increased by three times as described in the above conventional art. It is shown that light deterioration is still generated on the touch panel 12 or 16 at the position pushed by the stylus. Due to the light deterioration, a distorted image with a wave shape is observed around the pressurized position.

FIG. 5 shows a liquid crystal display panel according to a Japanese Laid-Open Patent Gazette No. 1985-182414, which has spacers patterned differently from those shown in FIGS. 1 and 2. FIG. 5 is a top view of a lower glass substrate 40 that include gate lines 41 and data lines 42 arranged to cross each other. Pixel electrodes 43 are positioned at cell areas defined by the gate and data lines 41 and 42.

Thin film transistors (TFTs) 44 are provided at each intersection between the gate and data lines 41 and 42 and serve as switches. A column of TFTs 44 respond to a signal from the gate line 41 to selectively connect a column of pixel electrodes 43 to the data lines 42, which are then used to input display information to each selected pixel electrode.

Patterned spacers 45 are formed on TFTs 44. Like the ball spacers 22 of FIGS. 1 and 2, the patterned spacers are formed to keep a uniform distance between the upper glass substrate (not shown in FIG. 5) and lower glass substrate 40. However, unlike the ball spacers of the previous figures, the patterned spacers 45 are overlapped with each pixel electrode 43. This allows the liquid crystal display panel to display a high quality picture.

However, even the liquid crystal display panel as shown in FIG. 5 has difficulty in keeping a uniform distance between the upper and lower glass substrates. This is because, like the ball spacers 22, the contact area of the spacers contacting the upper glass substrate is small. Because of the small contact area, the display panel cannot sufficiently absorb the pressure caused by a stylus or a finger. Thus like the display panels of FIGS. 1 and 2, local image distortion occurs, even for the display panel shown in FIG. 5.

SUMMARY OF THE INVENTION

Accordingly, it is an object of the present invention to provide a liquid crystal display panel mounted with a touch panel that is adapted for minimizing a local image distortion when pressure is applied to the touch panel through a stylus or a finger.

In order to achieve these and other objects of the invention, a touch panel-mounted liquid crystal is disclosed that includes a lower glass substrate having switching devices provided in the vicinity of intersections between data lines and gate lines; an upper glass substrate having a black matrix and being joined to the upper glass substrate; and a patterned spacer, being positioned at an area corresponding to the black matrix in such a manner to enlarge its contact area with the upper glass substrate, for constantly keeping a distance between the lower glass substrate and the upper glass substrate.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENTS

Figure 6:
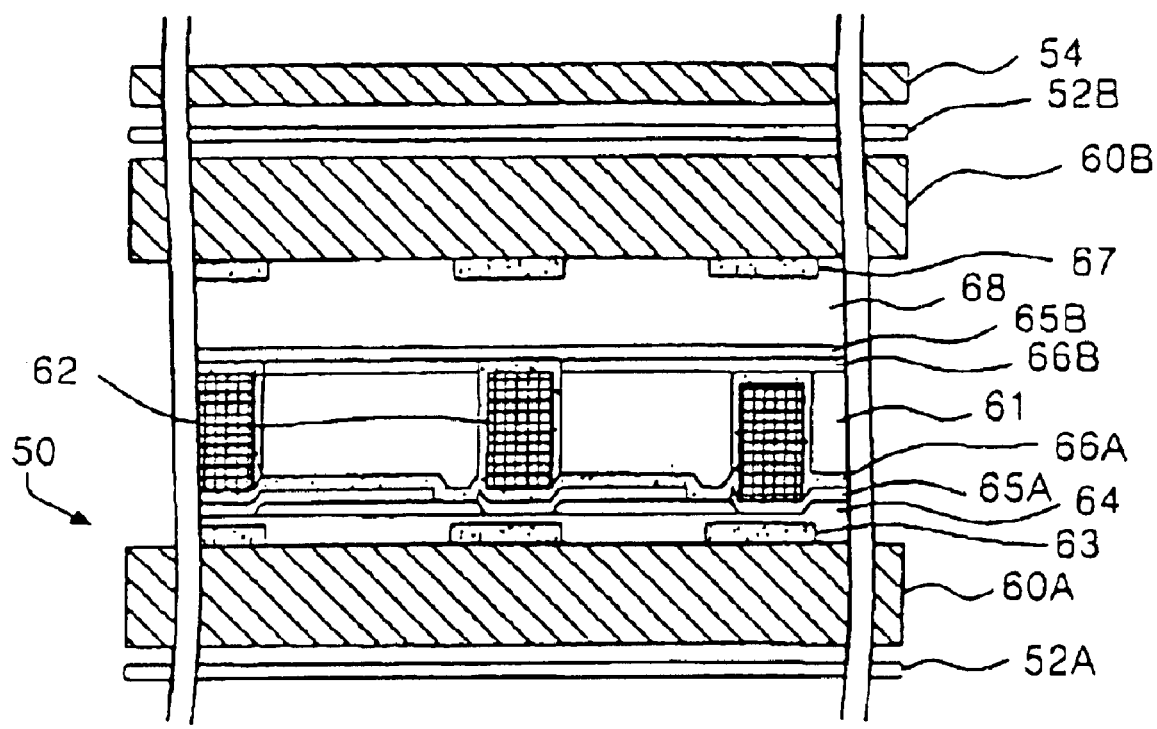
FIG. 6 is a sectional view showing a first embodiment of the present invention where a touch panel is mounted to a liquid crystal display panel.

FIG. 6 shows a liquid crystal display panel 50 according to a first embodiment of the present invention. The liquid crystal display panel 50 includes lower and upper polarizing sheets 52A and 52B. A touch panel 54 is disposed above the upper polarizing sheet 52B.

Lower and upper glass substrates 60A and 60B are positioned above and below the lower and upper polarizing sheets 52A and 52B, respectively. Gate lines 63, insulating film 64, pixel electrodes 65A, and a first orientation film 66A are sequentially provided above the lower glass substrate 60A. Below the upper glass substrate 60B, black matrix 67, color filter 68, a common electrode 65B, and a second orientation film 66B are also sequentially provided.

Patterned spacers 62 and a liquid crystal material 61 are disposed between the first and second orientation films 66A and 66B. The patterned spacers 62 are formed by photolithographic methods over the pixel electrodes 65A before the first orientation film 66A is formed. The patterned spacers 62 are made of an insulating material and are positioned to coincide with areas occupied by the black matrix 67. The first orientation film 66A is uniformly formed over the surfaces of the pixel electrodes 65A as well as on the surfaces of the patterned spacers 62.

Figure 1:
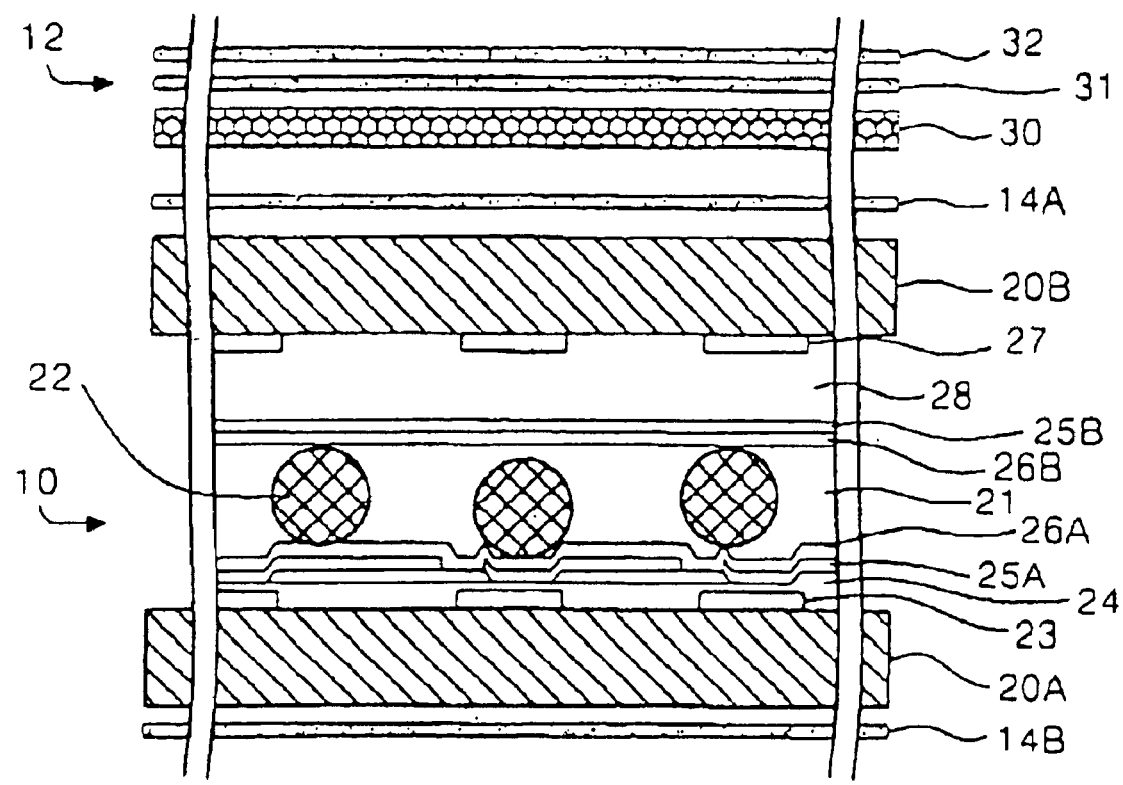
FIG. 1 is a sectional view showing a structure of a conventional liquid crystal display panel mounted with a capacitive touch panel.
Figure 2:
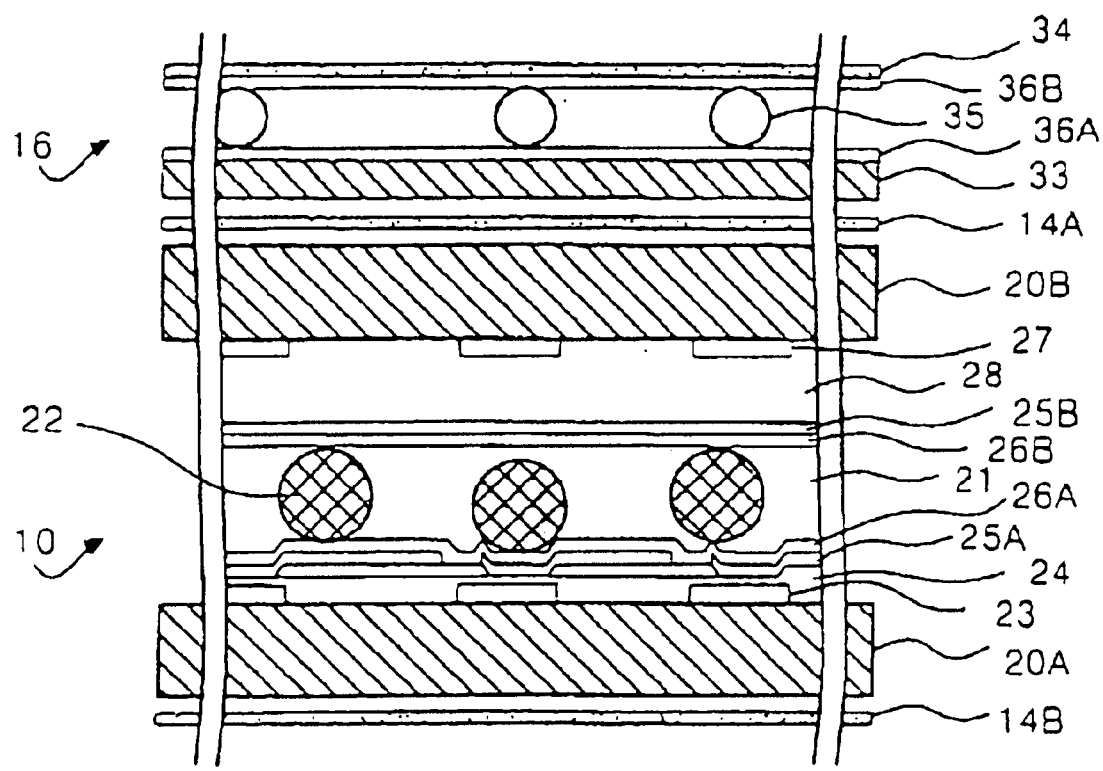
FIG. 2 is a sectional view showing a structure of a conventional liquid crystal display panel mounted with a resistive touch panel.
Figure 3:
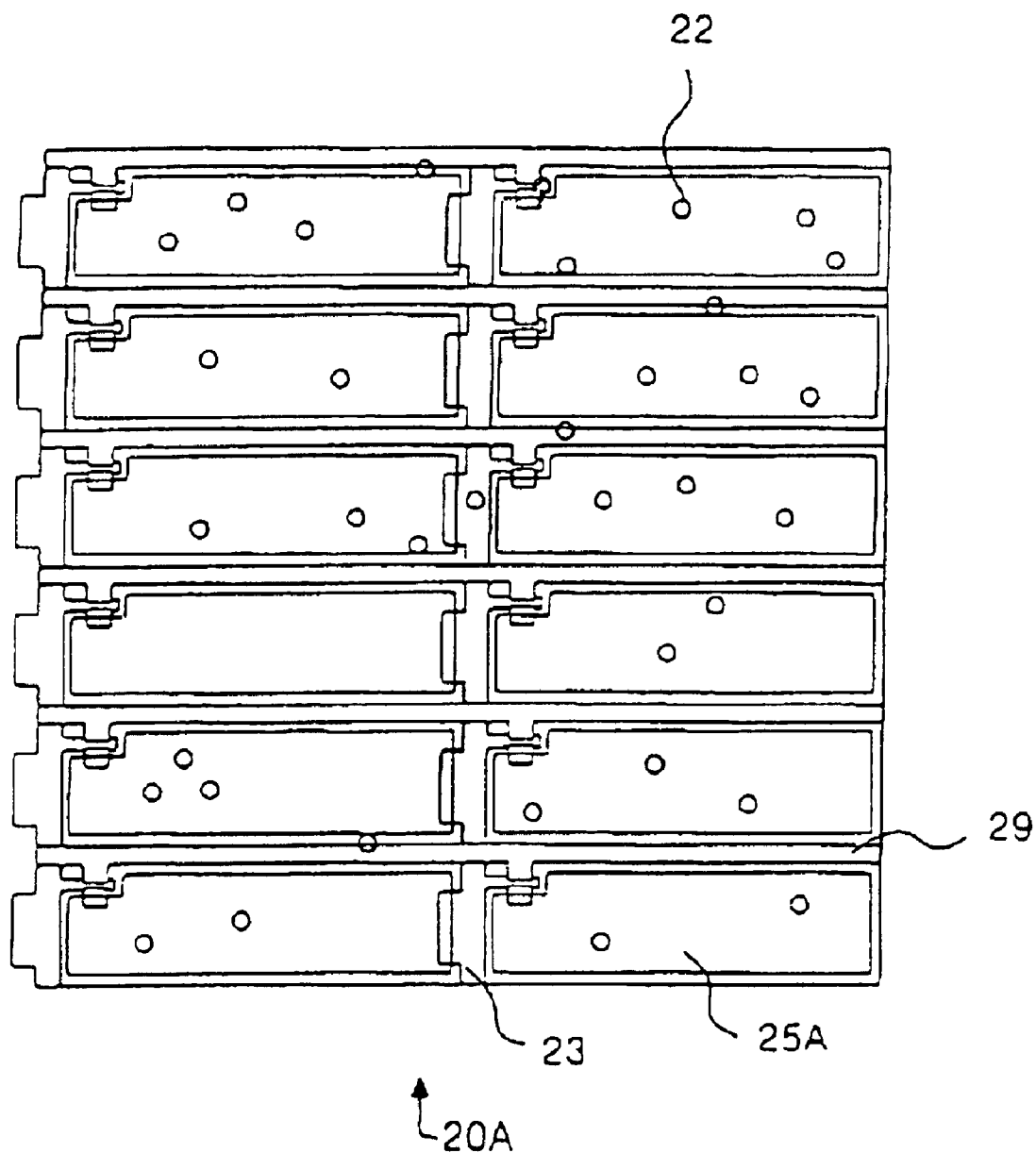
FIG. 3 is a plan view illustrating a state of the ball spacers spread on the lower glass substrate shown in FIG. 1 and FIG. 2.

The lower and upper glass substrates 60A and 60B are joined with each other. The lower and upper glass substrates 60A and 60B joined in this manner are spaced uniformly spaced apart through the aid of the patterned spacers 62. That is, the patterned spacers 62 serve the same function as the ball spacers of FIGS. 1 and 2, i.e., they maintain a uniform distance between lower and upper glass substrates 60A and 60B.

The touch panel 54 generates a voltage or current signal corresponding to the pressurized point just as described above.

Figure 7:
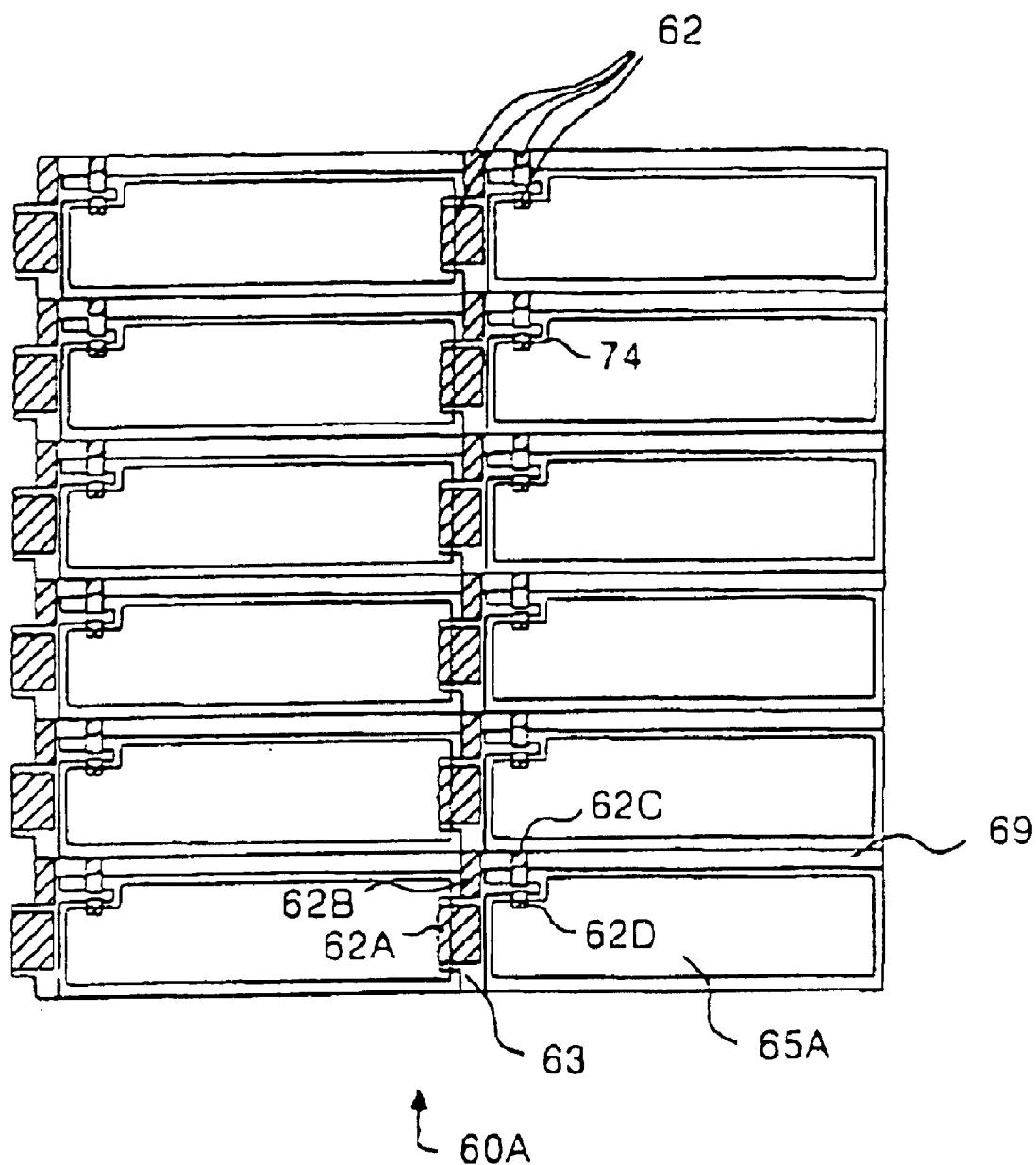
FIG. 7 is a plan view showing a layout of the lower glass substrate in FIG. 6.

FIG. 7 shows a layout of the lower glass substrate 60A provided with the patterned spacers 62. In FIG. 7, the lower glass substrate 60A includes gate lines 63 and data lines 69 arranged to cross each other. Pixel electrodes 65A positioned at cells defined by the gate and data lines 63 and 69.

TFTs 74 are provided near each intersection between the gate and data lines 63 and 69 and serve as switches. A column of TFTs 74 respond to a signal from the gate line 63 to selectively connect a column of pixel electrodes 65A to the data lines 69, which are then used to input display information to each selected pixel electrode.

The data lines 69 are formed on the on the lower glass substrate 60A before the TFTs 74 are formed, and the TFTs 74 are formed on the surface of the lower glass substrate 60A before the insulating film 64 is formed. Each gate electrode of the TFTs 74 is formed along with the gate lines 63. Each source and the drain of the TFTs 74 are electrically connected to the data line 69 and the pixel electrodes 65A, respectively.

The black matrix 67 on the upper glass substrate 60B overlaps the gate and data lines 63 and 69. The patterned spacers 62 also are positioned on the lower glass substrate 60A to coincide with the area of the black matrix area.

Each patterned spacer 62 includes first through fourth spacers 62A to 62D. The first spacer 62A is positioned over the gate line 63 between the data lines 69; the second spacer 62B is positioned over the intersection between the gate line 63 and the data line 69; the third spacer 62C is positioned over a contact connecting the source of the TFT 74 to the data line 69; and the fourth patterned spacer 62D is positioned over a portion of a contact connecting the drain of the TFT 74 to the pixel electrode 65A.

Alternately, each patterned spacer can be described as being a cluster of spacers, wherein each cluster includes the first through fourth spacers 62A to 62D. And the multiple clusters can be described as being arranged in a matrix.

Also the first through fourth spacers can be characterized as being matrices of clusters. For example, a first matrix of first spacers may comprise multiple first spacers 62A and a second matrix of second spacers may comprise multiple second spacers 62B. Similarly, a third matrix of third spacers may comprise either multiple third spacers 62C or multiple fourth spacers 62D.

As noted previously, the spacers 62A to 62D keep the lower and upper glass substrates 60A and 60B a uniform distance from each other. Also, the spacers 62A to 62D enlarge the contact area of the patterned spacer 62 with the upper glass substrate 60B. The enlarged contact area enables the patterned spacer 62 to sufficiently absorb the load applied to the upper glass substrate 60B when the touch panel 54 is pressurized. Accordingly, the distance between the upper and lower glass substrates 60B and 60A can be kept uniform even when pressure is applied to the touch panel 54. A result is that the light deterioration as well as the local image distortion is prevented or minimized.

Figure 4A:
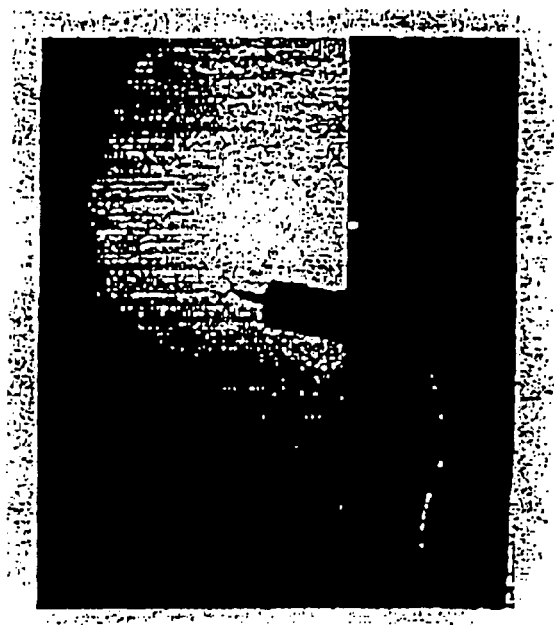
FIGS. 4A and 4B show a distorted state of a picture on the liquid crystal display panel having the ball spacers when the touch panel has been pushed by a stylus pen.
Figure 4B:
Figure 5:
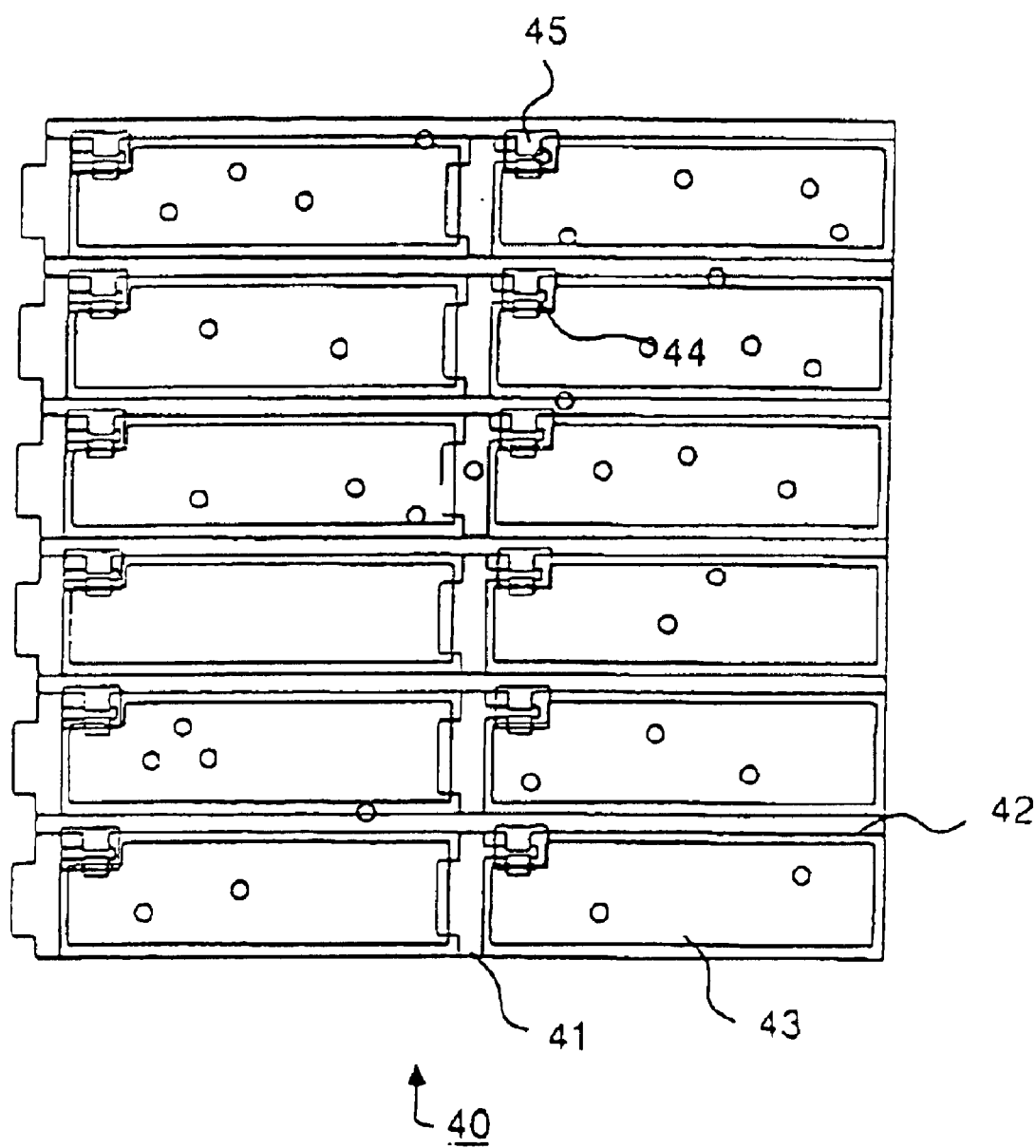
FIG. 5 is a plan view of the lower glass substrate of another conventional liquid crystal display panel having patterned spacers.
Figure 8A:
FIGS. 8A and 8B show a state of a picture displayed on the liquid crystal display panel of FIG. 6 when the touch panel has been pushed by a stylus pen.
Figure 8B:

Furthermore, because the spacers 62A to 62D are positioned to coincide with the black matrix area, this allows the liquid crystal display panel to achieve a uniform display contrast throughout. The uniform contrast, in turn, improves the quality of the image displayed. For example, FIGS. 8A and 8B show a display device according to the first embodiment. It is seen that the wave shape as shown in FIG. 4 does not appear around the position pushed by the stylus pen. In other words, the touch panel-mounted liquid crystal display panel according to the first embodiment is capable of preventing light deterioration and image distortion.

Figure 9:
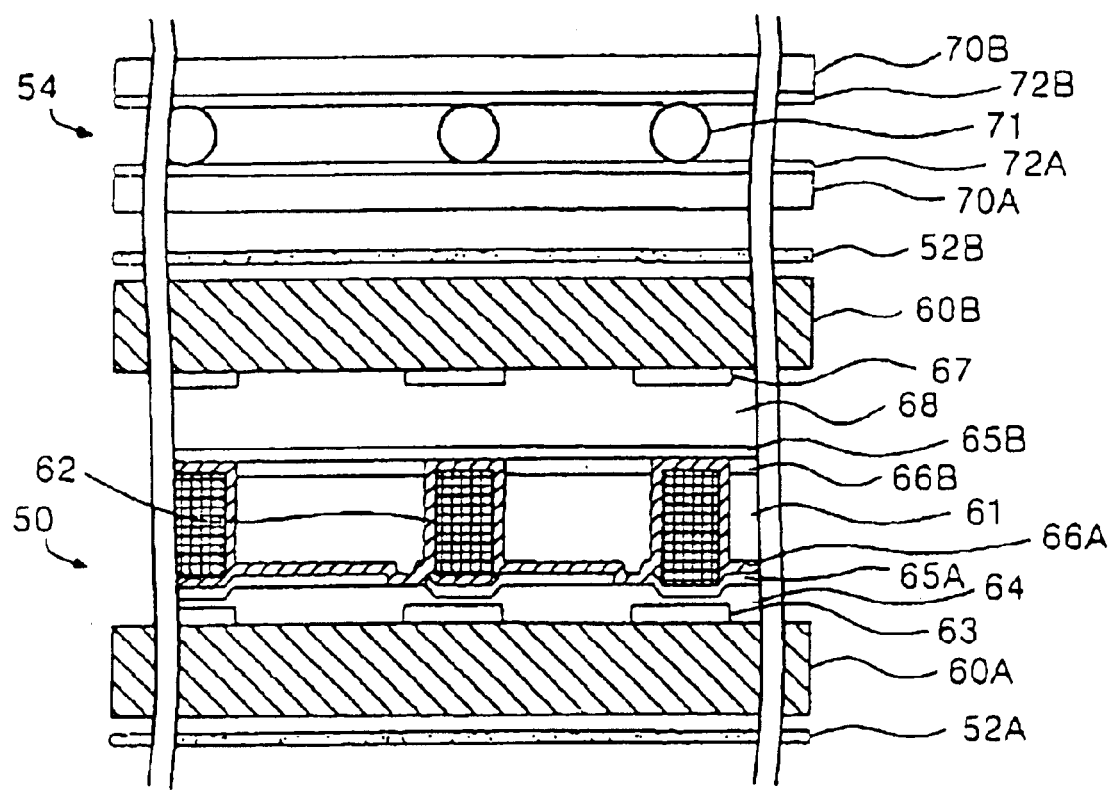
FIG. 9 is a detailed sectional view of the structure shown in FIG. 6.

FIG. 9 shows the touch panel 54 of FIG. 6 in more detail. As shown, the touch panel 54 includes lower and upper glass sheets 70A and 70B; first and second electrode layers 72A and 72B disposed above and below the lower and upper glass sheets, respectively; and touch panel spacers 71 disposed in between the first and second electrode layers 72A and 72B. This is the same resistive touch panel shown in FIG. 2. However, the capacitive touch panel shown in FIG. 1 may be mounted on the liquid crystal display panel 50 as well.

Figure 10:
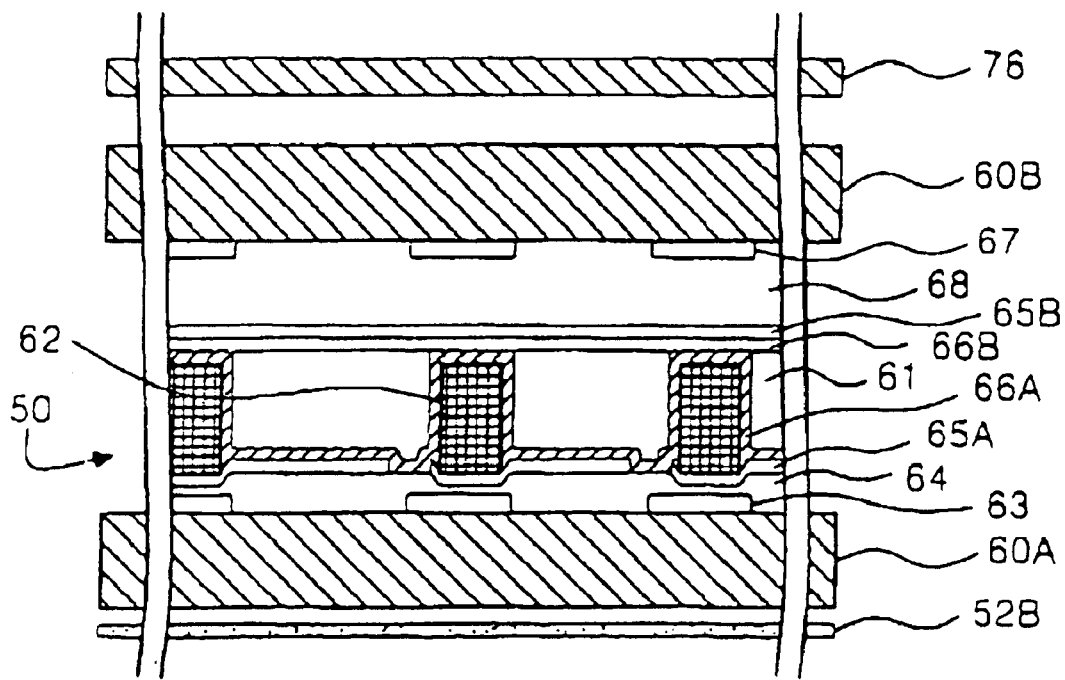
FIG. 10 is a sectional view showing a second embodiment of the present invention where a touch panel is mounted to a liquid crystal display panel.

FIG. 10 is a sectional view of a combined touch panel and liquid crystal display panel according a second embodiment of the present invention. In this embodiment, a polarizing sheet is made to be a part of a touch panel 73. In FIG. 10, the liquid crystal display panel 50 is the same as shown in FIG. 6 except that the display panel 50 does not include the upper polarizing sheet. That is, the liquid display panel 50 of FIG. 10 includes the upper glass substrate 60B and the lower polarizing sheet 52B. Because the parts of the liquid display panel 50 have been described above, detailed discussion of the display panel 50 is omitted.

Figure 11:
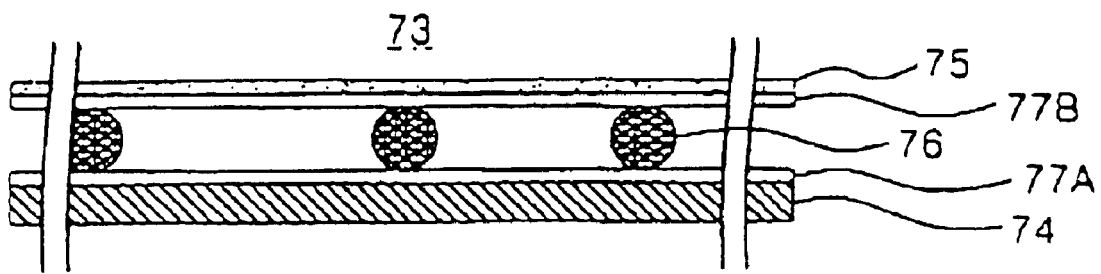
FIG. 11 is a detailed view of the touch panel of FIG. 10.

As shown in FIG. 10, the touch panel 73 is mounted above the upper glass substrate sheet 52B. In this second embodiment, an upper polarizing sheet 75 is made to be a part of the touch panel 73 as shown in FIG. 11. This simplifies the structure of the liquid crystal display panel 50 of FIG. 10.

FIG. 11 is a detailed view of the touch panel 73 of FIG. 10. As shown, the touch panel 73 includes a glass sheet 74 disposed above the upper glass substrate 60B (shown in FIG. 10), a first and second electrode layers 77A and 77B above the glass sheet 74, panel ball spacers 76 in between the first and second electrode layers 77A and 77B, and the upper polarizing sheet 75 above the second electrode layer 77B.

When pressure is applied to the touch panel 73, the first and second electrode layers 77A and 77B are shorted at the pressurized point. As discussed previously, this generates a voltage or a current signal corresponding to the pressurized position.

Figure 12:
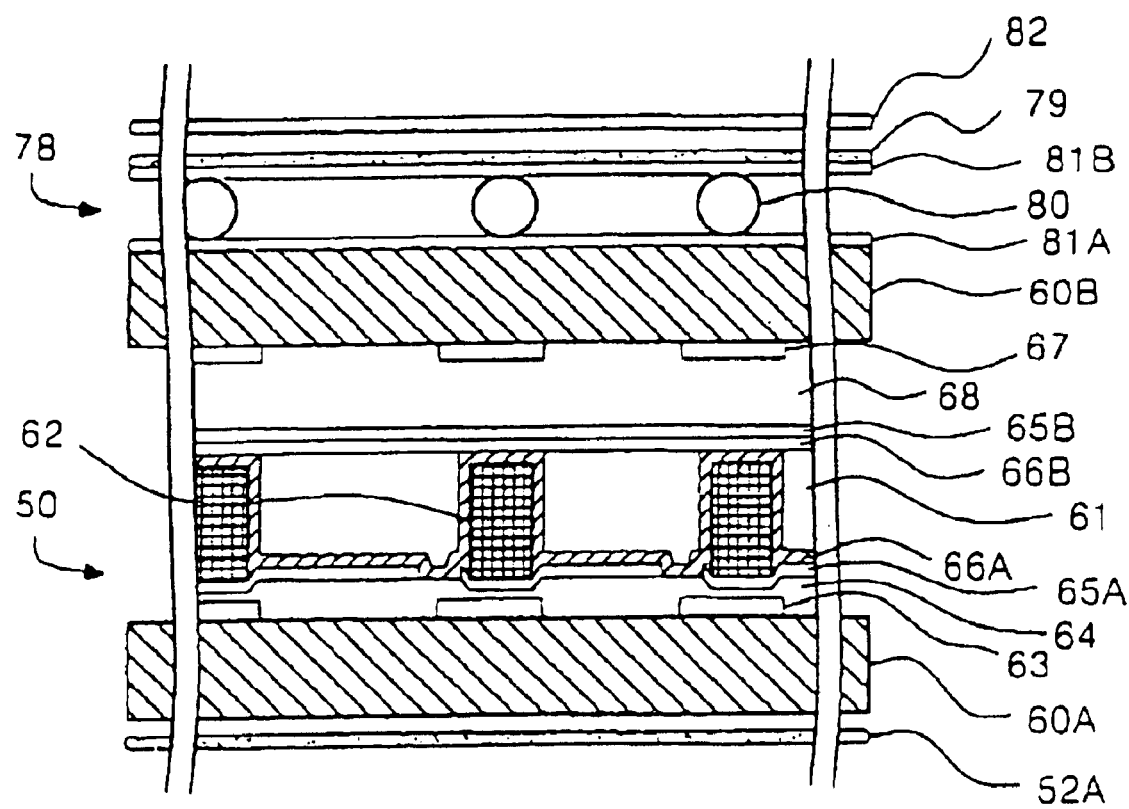
FIG. 12 is a sectional view showing a third embodiment of the present invention where a touch panel is integrated with a liquid crystal display panel.

FIG. 12 shows a liquid crystal display panel according to a third embodiment of the present invention. Like the second embodiment, a polarizing sheet is made integral with the touch panel 78 in this third embodiment. Again, the detailed discussion of the liquid crystal display panel 50 is omitted.

As shown, the resistive touch panel 78 is disposed above the upper glass substrate 60B and include in sequence a first electrode 81A, panel spacers 80, a second electrode 81B, a glass sheet 79, and a polarized sheet 82. Note that the lower glass sheet 70A of FIG. 9 is not included in this embodiment. Again, this resistive touch panel 78 functions like other resistive touch panels described previously in that when pressure is applied, the first and second electrodes 81A and 81B are shorted to create a voltage or a current signal corresponding to the pressurized point.

In this third embodiment, the touch panel 78 and the liquid crystal display panel 50 are integrated with each other by removing the lower glass sheet. Accordingly, the integrated structure of the liquid crystal display panel 50 and the touch panel 78 is made simpler.

Figure 13:
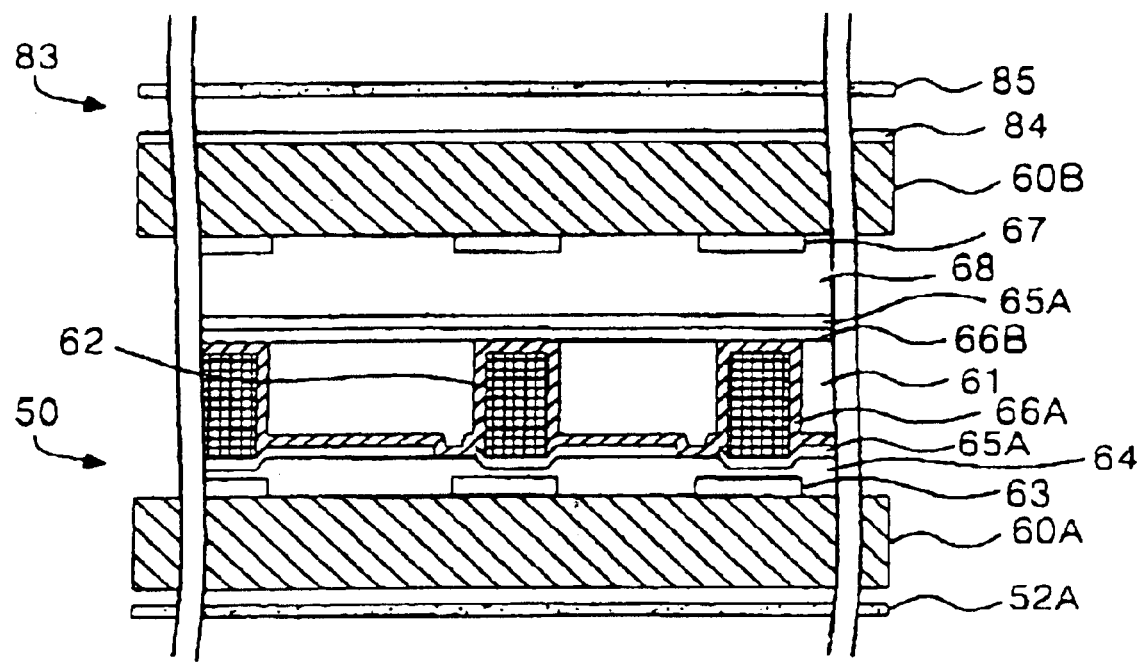
FIG. 13 is a sectional view showing a fourth embodiment of the present invention where a touch panel is integrated with a liquid crystal display panel.

FIG. 13 shows a liquid crystal display panel according to a fourth embodiment of the present invention. The fourth embodiment is like the third embodiment, except that the touch panel is capacitive. Because of the integration, the entire structure is made simpler.

As before, the detailed discussion of the liquid crystal display panel 50 is omitted. As shown, the capacitive touch panel 83 is integrated on top of the upper glass substrate 60B. The touch panel 83 includes a transparent electrode layer 84 formed on an upper glass substrate 60B and a polarizing sheet 85 disposed on the transparent electrode layer 84. Like other capacitive touch panels, varying capacitance is detected at the pressurized points and a corresponding voltage or current signal is generated.

As describe above, according to the present invention, the contact area between the patterned spacers and the upper glass substrate is enlarged, which increases the capability to absorb the pressure load of a stylus or a finger. Accordingly, the distance between the upper and lower glass substrates can be kept uniform even when pressure on the touch panel is applied. As a result, a light deterioration of the light panel and local image distortion is prevented or minimized. Furthermore, the patterned spacers are positioned at the black matrix area, so that a uniform contrast and a high quality images can be obtained.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A touch screen device, comprising:
   a touch panel; and
   a liquid crystal display (LCD) panel, said LCD panel including an upper glass substrate on a lower surface of which a black matrix is formed in a regular pattern, a lower glass substrate having a plurality of gate lines and a plurality of data lines below said upper glass substrate, and a plurality of patterned spacers disposed above said lower glass substrate, wherein each said patterned spacer has multiple contact areas with said upper glass substrate, and each said patterned spacer is positioned within an area in which the black matrix overlaps the gate lines and the data lines, wherein the multiple contact areas comprise a first spacer, a second spacer a third spacer, and a fourth spacer, and the first spacer is positioned over a gate line between data lines, the second spacer is over an intersection between the gate line and the date line, the third spacer is over a contact connecting a source of a TFT to the data line, and the fourth spacer is over a portion of a contact connecting a drain of the TFT to a pixel electrode.

2. The device of claim 1, wherein said touch panel is resistive.

3. The device of claim 2, wherein said touch panel comprises:
   a lower glass sheet disposed above said liquid crystal display panel;
   a first electrode layer disposed above said glass sheet;
   a second electrode layer disposed above first electrode layer; and
   touch panel spacers disposed between said first and second electrode layers.

4. The device of claim 3, wherein said touch panel further comprises:
   an upper glass sheet disposed above said second electrode layer.

5. The device of claim 3, wherein said touch panel further comprises:
   a polarizing sheet disposed above said second electrode layer.

6. The device of claim 2, wherein said touch panel comprises:
   a first electrode layer disposed above said glass sheet;
   a second electrode layer disposed above first electrode layer;
   touch panel spacers disposed between said first and second electrode layers; and
   a glass sheet disposed above said second electrode layer.

7. The device of claim 1, wherein said touch panel is capacitive.

8. The device of claim 7, wherein said touch panel comprises:
   an electrode layer disposed above said glass sheet; and
   an insulating layer disposed above said electrode layer.

9. The device of claim 8, wherein said touch panel further comprises:
   a glass sheet disposed between said electrode layer and said liquid crystal display panel.

10. The device of claim 1, wherein the multiple contact areas are a cluster of spacers.

11. The device of claim 1, wherein the first spacer is a first matrix of spacers, the second spacer is a second matrix of spacers, the third spacer is a third matrix of spacers, and the fourth spacer is a fourth matrix of spacers.

12. The device of claim 1, wherein the contact areas are a uniform distance from each other.

13. A method to form a touch screen device, comprising:
   forming an upper glass substrate on a lower surface of which a black matrix is formed in a regular pattern;
   forming a lower glass substrate having a plurality of gate lines and a plurality of data lines below said upper glass substrate;
   forming a plurality of patterned spacers above said lower glass substrate such that each said patterned spacer has multiple contact areas with said upper glass substrate, and each said patterned spacer is positioned within an area in which the black matrix overlaps the data lines and the gate lines and the multiple contact areas comprise a first spacer, a second spacer, a third spacer and a fourth spacer, and the first spacer is positioned over a gate line between data lines, the second spacer is over an intersection between the gate line and the date line, the third spacer is over a contact connecting a source of a TFT to the data line, and the fourth spacer is over a portion of a contact connecting a drain of the TFT to a pixel electrode; and
   forming a touch panel over said upper glass substrate.

14. A touch screen device comprising:
   a touch panel; and
   a liquid crystal display (LCD) panel, said LCD panel including an upper glass substrate on a lower surface of which a black matrix is formed in a regular pattern, a lower glass substrate having a plurality of gate lines and a plurality of data lines below said upper glass substrate, and a plurality of patterned spacers disposed above said lower glass substrate, each said patterned spacer having multiple contact areas with said upper glass substrate and being positioned within an area in which the black matrix overlaps the data lines and the gate lines, whereby a distance between the upper glass substrate and the lower glass substrate can be kept uniform when pressure is applied to the touch panel, wherein the multiple contact areas comprise a first spacer, a second spacer, a third spacer and a fourth spacer, and the first spacer is positioned over a gate line between data lines, the second spacer is over an intersection between the gate line and the date line, the third spacer is over a contact connecting a source of a TFT to the data line, and the fourth spacer is over a portion of a contact connecting a drain of the TFT to a pixel electrode.

15. A touch screen device comprising:
   a touch panel; and
   a liquid crystal display (LCD) panel, said LCD panel including an upper glass substrate on a lower surface of which a black matrix is formed in a regular pattern, a lower glass substrate having a plurality of gate lines and a plurality of data lines below said upper glass substrate, and a plurality of patterned spacers disposed above said lower glass substrate, each said patterned spacer being a cluster of spacers having multiple contact areas with said upper glass substrate and being positioned within an area in which the black matrix overlaps the data lines and the gate lines, whereby a distance between the upper glass substrate and the lower glass substrate can be kept uniform when pressure is applied to the touch panel, wherein the multiple contact areas comprise a first spacer, a second spacer, a third spacer and a fourth spacer, and the first spacer is positioned over a gate line between data lines, the second spacer is over an intersection between the gate line and the date line, the third spacer is over a contact connecting a source of a TFT to the data line, and the fourth spacer is over a portion of a contact connecting a drain of the TFT to a pixel electrode.

16. A touch screen device comprising:

a touch panel; and a liquid crystal display (LCD) panel, said LCD panel including an upper glass substrate on a lower surface of which a black matrix is formed in a regular pattern, a lower glass substrate having a plurality of gate lines and a plurality of data lines below said upper glass substrate, and a plurality of patterned spacers disposed above said lower glass substrate, each said patterned spacer being a cluster of spacers having multiple contact areas with said upper glass substrate and being positioned within an area in which the black matrix overlaps the data lines and the gate lines, and the multiple contact areas are a first spacer, a second spacer, a third spacer and a fourth spacer, whereby a distance between the upper glass substrate and the lower glass substrate can be kept uniform when pressure is applied to the touch panel, wherein the multiple contact areas comprise a first spacer, a second spacer, a third spacer and a fourth spacer, and the first spacer is positioned over a gate line between data lines, the second spacer is over an intersection between the gate line and the date line, the third spacer is over a contact connecting a source of a TFT to the data line, and the fourth spacer is over a portion of a contact connecting a drain of the TFT to a pixel electrode.

* * * * *